(12) United States Patent
Shani et al.

(10) Patent No.: US 8,049,656 B2
(45) Date of Patent: Nov. 1, 2011

(54) RF DECOY AND METHOD FOR DECEIVING RADAR-BASED MISSILES

(75) Inventors: Moshe Shani, Reut (IL); Avraham Cohen, Bet Hashmonai (IL); Arye Amarant, Hashmonaim (IL); Ely Levine, Rehovot (IL)

(73) Assignee: RST Reut Systems & Advanced Technologies Ltd., Ra'Annana (IL)

( * ) Notice: Subject to any disclaimer, the term of this patent is extended or adjusted under 35 U.S.C. 154(b) by 508 days.

(21) Appl. No.: 11/774,832

(22) Filed: Jul. 9, 2007

(65) Prior Publication Data

US 2008/0198060 A1 Aug. 21, 2008

(51) Int. Cl.
*G01S 7/38* (2006.01)
*H04K 3/00* (2006.01)
(52) U.S. Cl. ............................... 342/14; 342/13
(58) Field of Classification Search .......... 342/9, 12–14; 455/1
See application file for complete search history.

(56) References Cited

U.S. PATENT DOCUMENTS

| | | | | |
|---|---|---|---|---|
| 3,852,747 A | * | 12/1974 | Morand | 342/15 |
| 4,217,580 A | * | 8/1980 | Lowenschuss | 342/13 |
| 4,520,363 A | * | 5/1985 | Wachspress et al. | 343/828 |
| 4,808,999 A | | 2/1989 | Toman | |
| 5,047,774 A | | 9/1991 | Kimber et al. | |
| 5,136,295 A | | 8/1992 | Bull et al. | |
| 5,260,820 A | | 11/1993 | Bull et al. | |
| 5,786,786 A | * | 7/1998 | Small | 342/13 |
| 6,429,800 B1 | | 8/2002 | Richmond | |
| 6,804,495 B2 | | 10/2004 | Duthie | |
| 6,933,877 B1 | | 8/2005 | Halladay et al. | |
| 2004/0201518 A1 | | 10/2004 | Pace et al. | |
| 2005/0001755 A1 | | 1/2005 | Steadman et al. | |
| 2005/0179577 A1 | | 8/2005 | Eneroth | |

OTHER PUBLICATIONS

PCT International Search Report and Written Opinion mailed Jun. 2, 2008.

* cited by examiner

*Primary Examiner* — Ian Lobo

(57) ABSTRACT

An expendable, stand-alone, off-board Electronic Counter-Measure system, airborne RF decoy aimed to provide airborne platforms with protection against multiple radar-based threats including Air-to-Air and Surface-to-Air missiles both active and semi-active ones. The airborne RF decoy has the mechanical outline of standard chaff and flare decoys and is safely ejected from any platform by pyrotechnic elements. The airborne RF decoy deceives enemy radar-based threats as follows: immediately after its ejection from the protected airborne platform, the decoy activates an energy source, stabilizes its path, acquires illuminating signals and analyzes threat parameters. Then the decoy alters the received signals to generate an authentic false target and transmits a deceiving signal towards the radar threat. The radar threats locks on the decoy and follow its path. Thus the threat course is diverted from the protected airborne platform and a large miss distance of the attacking missile (tens to hundreds of meters) is assured.

32 Claims, 5 Drawing Sheets

RF DECOY AND METHOD FOR DECEIVING RADAR-BASED MISSILES

FIELD OF THE INVENTION

The present invention relates to electronic countermeasures for protecting an aircraft against enemy missile attacks and, more particularly, to an airborne RF decoy that deceives a radar-based missile to track it instead of tracking the aircraft.

BACKGROUND OF THE INVENTION

Electronic countermeasures (ECM) are a subsection of electronic warfare (EW) which includes any sort of electrical or electronic device designed to deceive radar, sonar, or other detection systems. Electronic countermeasures may be used both offensively and defensively in any method to deny targeting information to an enemy. For example, ECM may cause the detecting radar system to falsely "identify" many separate targets or make the real target appear and disappear or move about randomly. ECM is used effectively to protect aircraft from guided missiles. Most air forces use them to protect their aircraft from attack.

Offensive ECM often takes the form of jamming. Defensive ECM includes using chaff and flares against incoming missiles, as well as soids (floating flares that are effective only in the terminal phase of missiles with infrared signature seeker heads), blip enhancement and jamming of missile terminal homers. When employed effectively ECM can keep aircraft from being tracked by search radars, surface-to-air missiles and air-to-air missiles.

Electronic counter-countermeasures (ECCM) describe a variety of practices which attempt to reduce or eliminate the effect of ECM on electronic sensors aboard vehicles, ships and aircraft and weapons such as missiles. ECCM is also referred to as Electronic Protective Measures (EPM), chiefly in Europe.

ECM is practiced by nearly all military units—land, sea or air. Aircraft are the primary weapons in the ECM battle because they can "see" a larger patch of earth than a sea or land-based unit. When employed effectively ECM can keep aircraft from being tracked by search radars, surface-to-air missiles and air-to-air missiles.

Modern radar-based threat systems with advanced Electronic Counter-Counter Measures capabilities are immune to existing on-board ECM techniques and pose a real threat to airborne platforms. Several methods for off-board protecting means had been suggested in the past. U.S. Pat. No. 5,333,814 describes a towed body aimed to intercept or collide with incoming threats but without any ECM capability. U.S. Pat. No. 6,492,931 describes an expendable decoy that operates off-board but is dependent on the equipment residing in the protected platform. This decoy is not a stand-alone jammer that can work autonomously against multiple targets and it poses major limitations on the flight envelope of the platform after the launching. Other towed decoy jammers are also known to act in close dependence with the protected platform, both electrically and mechanically. These types of decoy also limit the aircraft maneuvers and lowers the efficiency of other protective measures.

U.S. Pat. No. 6,429,800 deals with a true off-board expendable jammer. However, this decoy has no "receive" capability and/or any independent recognition of the enemy threats. It has no Digital Radio Frequency Memory (DRFM)-based equipment that can optimize the deceiving technique, nor any updating mechanism. It has no mechanical and aerodynamical detailed design. The spatial coverage and the frequency coverage are not explicitly described, thus the efficiency against multiple type threats arising from all directions is not proved.

SUMMARY OF THE INVENTION

The present invention provides an airborne Radio Frequency (RF) decoy that answers to the modern threats which overcomes the above mentioned limitations with full off-board and stand alone capabilities. The goal of the airborne RF decoy of the invention is to "pull/steal" the tracking of the missile and/or radar away from the protected airborne platform and towards the off-board decoy. The decoy thus causes the enemy attacking missile to explode at a sufficiently large distance from the protected airborne platform.

The airborne RF decoy of the invention can cope with multiple threats coming from any direction. The decoy does not require intimate knowledge of the technical details of the threats, thus providing a robust ECM solution.

The airborne RF decoy of the invention is an expendable, stand-alone, off-board Electronic Counter-Measure (ECM) system aimed to provide airborne platforms with protection against multiple radar-based threats including Air-to-Air (AA) and Surface-to-Air (SAM) missiles both active and semi-active ones. The airborne RF decoy is a stand-alone system that includes a receiver, a transmitter, a digital RF memory (DRFM), a power source and one or more omnidirectional EW antennas, all of which operate dependently of the equipment residing in the protected platform itself.

The airborne RF decoy has the mechanical outline of standard chaff and flare decoys and is safely ejected from any platform by pyrotechnic elements. It is compatible with all existing industry dispensers so that no structural or aerodynamical changes are required to the airborne RF decoy, and the operational deployment process is straight forward, that is, identical to the process of ejecting a chaff or a flare.

The basic concept of operation of the airborne RF decoy of the invention uses a robust technique to deceive enemy radar-based threats as follows: immediately after its ejection from the protected airborne platform, the airborne RF decoy activates an energy source, stabilizes its path, acquires illuminating signals and analyzes threat parameters. Then the decoy alters the received signals to generate an authentic false target and transmits a deceiving signal towards the radar threat. The radar threats locks on the decoy and follow its path. Thus the threat course is diverted from the protected airborne platform and a large miss distance of the attacking missile (tens to hundreds of meters) is assured.

The airborne RF decoy of the invention operates in accordance with a Pre-Flight-Data (PFD) file which defines the most probable threat in the arena. The pre-flight-data file is loaded prior to the mission to each specific decoy by an external data loader via a dedicated connector that is embedded in the decoy. The decoy's data file can be updated by several methods: before ejection by a wire/proximity link, after ejection via a medium-range wireless link, or via a long-range wireless link with the protected airborne platform.

Once a long-range wireless link to the protected airborne platform is established, it can be used for synchronization purposes with the equipment on-board the platform. For example, it can be used for time synchronization with the platform's radars and self protection suit by blanking the airborne RF decoy at specific time intervals. Alternatively, it can be used for cooperative jamming by blinking between deceiving signals coming from the platform and from the decoy.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention relates to an airborne RF decoy adapted for protecting an airborne platform against multiple enemy radar-based threats, said airborne RF decoy comprising:

(i) means for receiving a plurality of radar signals from one or more directions;
(ii) means for storing said plurality of radar signals;
(iii) means for analyzing said plurality of radar signals to identify threat parameters;
(iv) means for altering said plurality of radar signals in order to deceive said multiple enemy radar-based threats;
(v) means for transmitting the altered radar signals; and
(vi) an independent power supply source.

The airborne RF decoy of the invention is an independent, stand-alone, autonomous flying body. It is not attached to the protected airborne platform by a cable or similar attaching mechanisms, rather the airborne RF decoy flies on its own means, using its own power supply source.

The term "airborne platform" as used herein includes fighter aircraft, wide-body transport aircraft, wide-body passenger aircraft, unmanned air vehicles (UAV), unmanned combat aircraft (UCA) and balloons.

Figure 1:
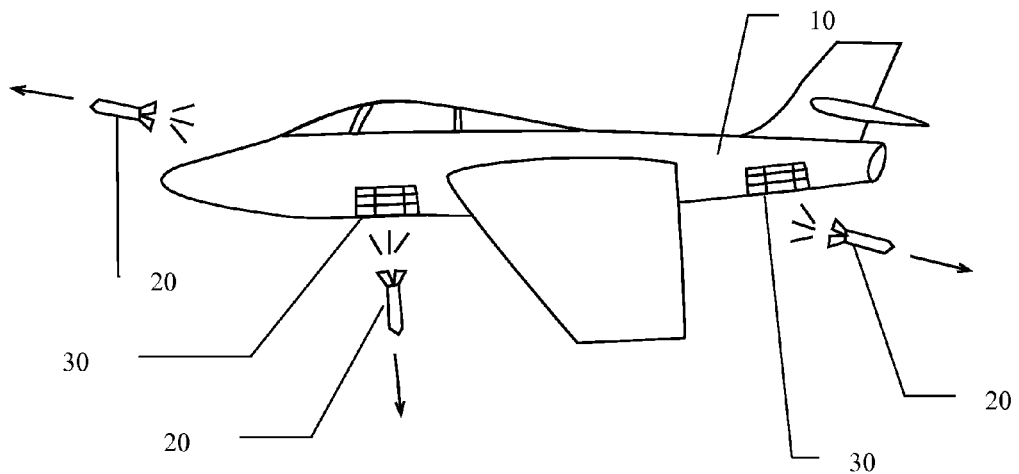
FIG. 1 shows the protected aircraft ejecting 3 airborne RF decoys, from 3 separate dispensers, towards different directions.

The installation of the airborne RF decoy of the invention on board of a typical airborne platform is shown in FIG. 1. The protected airborne platform 10 may eject at any instant one or several airborne RF decoys 20. The magazine of RF decoys 30 can be installed at various locations on the airborne platform 10 and the ejection can be directed towards any desired direction. FIG. 1 shows 3 ejected airborne RF decoys 20, one in the direction of the flight, a second one ejected sideways and the third airborne RF decoys 20 ejected at the rear of the aircraft, against the flight direction of the airborne platform 10. In one embodiment of the present invention, the ejection is done using pyrotechnic dispensers. A clear and fluent jettison process ensures the safety of the ejection in any flight positions and speeds of the protected platform. The airborne RF decoy 20 can be ejected by an automatic alert sent either from the on-board Missile Warning System (MWS) or from the Radar Warning Receiver (RWS) or by a manual command of the aircrew.

Figure 2:
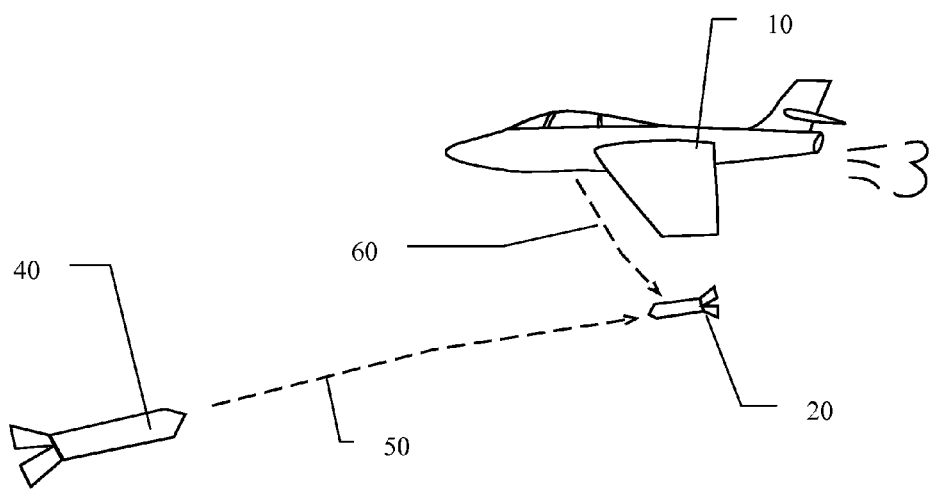
FIG. 2 shows the ejected airborne RF decoy attracting an approaching enemy missile towards itself.

The basic concept of operation uses a generic, robust and coherent technique to deceive the radar-based threats as follows. Once the airborne RF decoy 20 is activated it emits radio frequency (RF) signals that are very similar and coherent to radar signals that are scattered from the protected airborne platform 10 and produce coherent false targets to the enemy radar. FIG. 2 shows a radar-based threat, which is usually a radar-based missile 40 or a similar flying body, detecting the deceiving signal coming from the airborne RF decoy 20. The radar-based missile 40 interprets the deceiving signal as a legitimate target and "locks" its attack trajectory 50 towards the airborne RF decoy 20. Since the airborne RF decoy's 20 trajectory 60 differs from the trajectory of the protected airborne platform 10, the radar-based missile 40 hits or flies by (and explodes) the airborne RF decoy 20 at a distance of typically several hundreds of meters from the protected airborne platform 10.

Enemy radar-base threats usually include: air-to-air missiles 40 (both semi active and active), air-to-air fire-control radars (FCR), surface-to-air missiles (SAM) 40, surface-to-air radars or any combination thereof.

The airborne RF decoy 20 emits its deceiving signals within a broad spatial coverage both in azimuth and in elevation. Thus, it can effectively deceive threats coming from all directions.

In one embodiment of the present invention, the airborne RF decoy 20 includes means to control the distance between said airborne RF decoy 20 and said airborne platform 10. For example, the use of rocket propulsion mounted inside the airborne RF decoy 20 can control the relative distance between the protected airborne platform 10 and the airborne RF decoy 20. In some cases the airborne RF decoy 20 can move in a higher speed than the airborne platform 10 thus operating in front of the airborne platform 10 rather than at its back. The distance between the airborne RF decoy 20 and the airborne platform 10 ranges from tens to hundreds of meters in both range and altitude.

The airborne RF decoy 20 opens a large distance of tens to hundreds of meters from the protected airborne platform 10 both in range and in altitude thus any hit of a radar-based threat 40 occurs at a safe range from the airborne platform 10.

The airborne RF decoy 20 can handle multiple radar-based threats 40 simultaneously coming from many directions, thanks to one or more omnidirectional antennas embedded inside the airborne RF decoy 20. The omnidirectional antenna can receive a plurality of radar signals. The omnidirectional antenna or antennas are implemented without any erection mechanisms or moving parts. In order to improve the probability of deception, the airborne RF decoy 20 operates in accordance with a Pre Flight Data (PFD) file that defines the most probable radar-based threats 40 in the arena. The PFD file is loaded prior to the mission to each individual airborne RF decoy 20 by an external data loader via a dedicated connector.

In another embodiment of the present invention, the airborne RF decoy 20 includes means to communicate with the airborne platform 10. These communication means (links) include: (i) a wire or proximity link; (ii) a short-range wireless link; (iii) a long-range wireless link; or any combination thereof. The proximity link serves a distance of a few centimeters. The short-range link serves typically a distance of a few meters, while the long-range link can operate in a distance of hundreds of meters.

Figure 3:
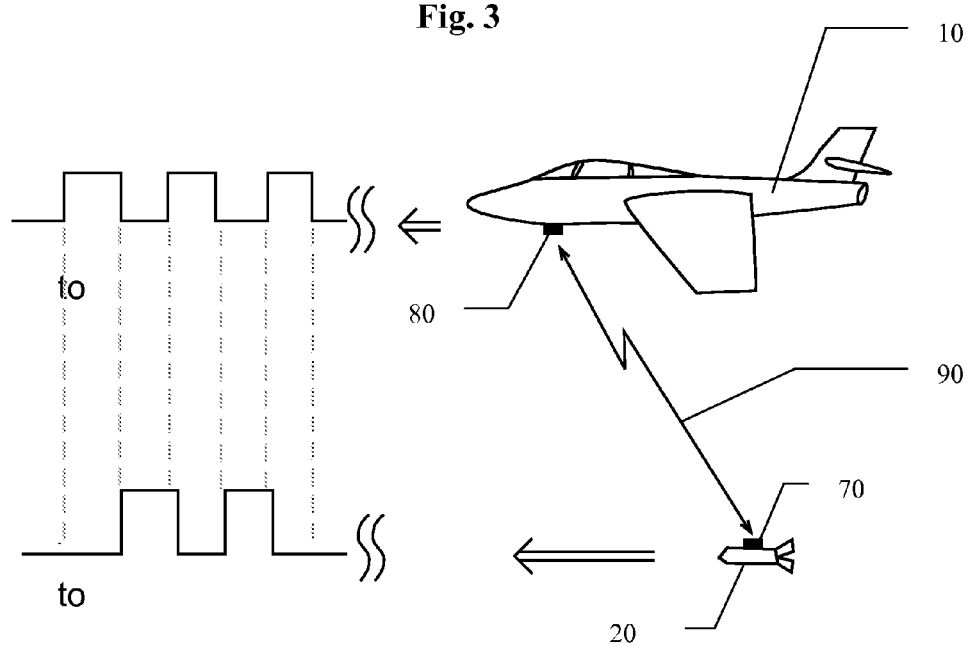
FIG. 3 illustrates the principle of synchronization/blinking between airborne RF decoy radars of the invention and a protected airborne platform's radars, via a long range wireless link.

The airborne RF decoy 20 PFD can be updated by several methods: the first method is before ejection by a wire or proximity link; the second method is after ejection via a medium-range wireless link; and the third method is via a long-range wireless link with the protected platform. FIG. 3 illustrates the airborne RF decoy 20 including a wireless radio link 70 which transmits/receives with the protected airborne platform's 10 wireless radio link 80 via a line of sight communication channel 90. This long-range communication link provides updating instructions to the airborne RF decoy 20 concerning the actual parameters of the threat such as frequency, bandwidth, transmit power, Pulse Repetition Frequency (PRF), Doppler shift, low frequency modulation (LFM) of the RF signal and others, to ensure the optimal generation of the false target transmission. It should be emphasized that although the airborne RF decoy 20 has the capability to receive and analyze the incoming signal threats, its deception is efficient against all various types of radar-guided threats (active and semi-active) without the need for intimate knowledge of their technical details. This inherent efficiency steams from the physical spatial separation between the airborne RF decoy 20 and the protected airborne platform 10.

In one embodiment of the present invention, the RF decoy 20 includes means for minimizing interferences between the airborne RF decoy 20 and the on-board equipment of the airborne platform 10.

In a further embodiment of the present invention, said means for minimizing interferences include either blanking of said airborne RF decoy 20 so it does not interfere with on-board equipment of the airborne platform 10 when operation of said on-board equipment has higher priority; or blanking on-board systems of the airborne platform 10 that interfere with said airborne RF decoy 20 when operation of said airborne RF decoy 20 has higher priority.

Once a long-range wireless link to the protected airborne platform 10 is established it can be used for cooperative jamming with the EW/ECM equipment on-board the airborne platform 10. For example, it enables generation of combined synchronized blinking between deceiving signals coming from the airborne platform 10 and from the airborne RF decoy 20. In addition, it can be used for time synchronization by blanking some systems, thus minimizing interferences between the airborne RF decoy 20 and the on-board equipment. FIG. 3 depicts a possible time sharing between the transmissions from the airborne RF decoy 20 and the transmissions from the radar installed on board of the protected airborne platform 10.

The spatial orientation of the airborne RF decoy 20, after the ejection from the airborne platform 10, can be stabilized in the roll plane, in one embodiment, or it is not stabilized in the roll plane, in another embodiment, making use of different embedded antenna polarizations. In most cases the radar-based threats 40 operate in a linear polarization. If the airborne RF decoy 20 is stabilized in the roll plane, its antenna is linear polarized. If the airborne RF decoy 20 is not stabilized in the roll plane, its antenna is circular polarized and has radiation capabilities in all roll angles.

In one embodiment of the present invention, said embedded antenna takes the form of a small monopole, an array of two monopoles or an array of three conformal radiating elements when said antenna operates in a linear polarization.

In another embodiment of the present invention, said embedded antenna takes the form of helical antennas when said antenna operates in a circular polarization.

The aerodynamical stabilization of the airborne RF decoy 20 is achieved by vertical and horizontal wings that are opened automatically after the ejection from the airborne platform 10. In order to improve the stabilization process, the wings are opened in two steps: a mechanical opening of the wings immediately after ejection followed by a pyrotechnic mechanism, which brings the wings to their final position. In a further embodiment of the present invention, a gas propulsion mechanism can be added to the airborne RF decoy 20, which enables to accelerate its path and contributes to its flight stability.

Figure 4:
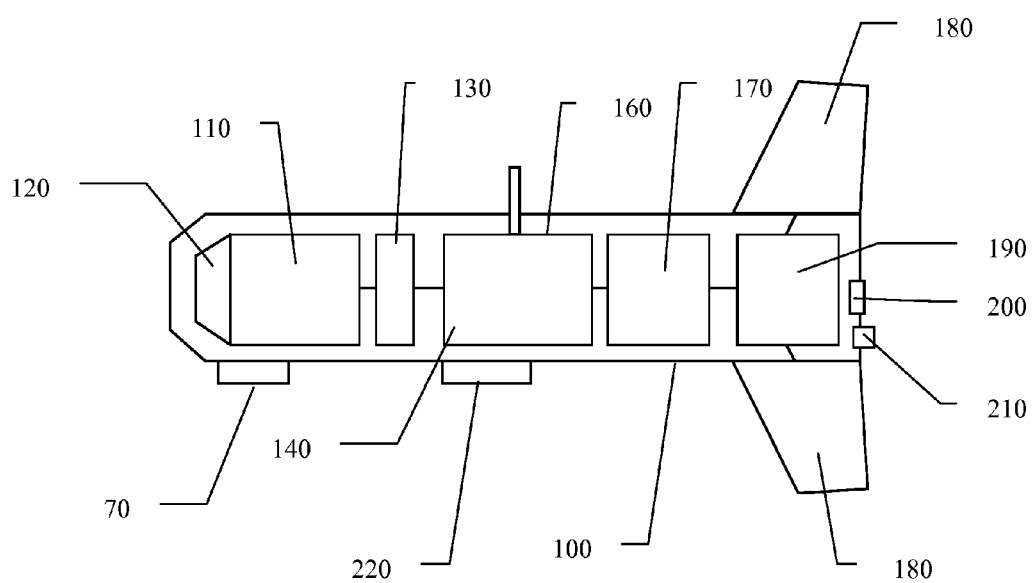
FIG. 4 illustrates a physical layout of an airborne RF decoy of the invention.

FIG. 4 shows the physical layout of the airborne RF decoy 20. An electric battery 110 provides the current and the voltage required for the entire period of operation of the airborne RF decoy 20. The preferred battery 110 is a thermal battery 110 that can be maintenance-free for a period of at least 10-15 years, being rechargeable or replaceable afterwards. The thermal battery 110 is activated at the instance of the ejection in by an appropriate mechanism 120. Alternatively, an alkaline battery 110 may be used instead of the thermal battery 110.

The power supply unit 130 is a DC to DC converter which accepts the voltage of the battery (at a nominal value of 12V) and transforms it to several regulated voltages (such as 8V, 5V, 3.3V, 1.8V, 1.2V etc). The RF board 140 includes a microwave low noise receiver operating at a direct conversion technology, a microwave high power transmitter, a frequency synthesizer and a T/R switch (or an isolator). The RF board 140 is connected to an EW antenna 160 mounted on the external envelope of the airborne RF decoy 20 and to a digital board 170 which includes a DRFM with a real time coherent memory and digital control components.

The entire body 100 of the airborne RF decoy 20 is stabilized during its flight by horizontal and vertical stabilization wings 180 and possibly by an additional propulsion mechanism.

In one embodiment of the present invention, said airborne RF decoy 20 has the external form of a standard chaff decoy or a standard flare decoy. The ejection of the airborne RF decoy 20 can thus be performed by pyrotechnic dispensing mechanisms that are identical to those of standard chaff or flare decoys. The airborne RF decoy 20 can thus be ejected from the airborne platform 10 via a standard housing of chaff or flare dispensers. The RF decoy 20 can thus be implemented in a Mobile Jettison Unit (MJU) such as an MJU-7 envelope (1×2×8 inches) or an MJU-10 envelope (2×2×8 inches).

In another embodiment of the present invention, the airborne RF decoy 20 is ejected via a dedicated housing.

In addition, the physical layout of the airborne RF decoy 20 may include a standard connector for software loading and tests 200, a wire/proximity communication module 210, a medium range communication module 220 and a long-range communication module 70.

Figure 5:
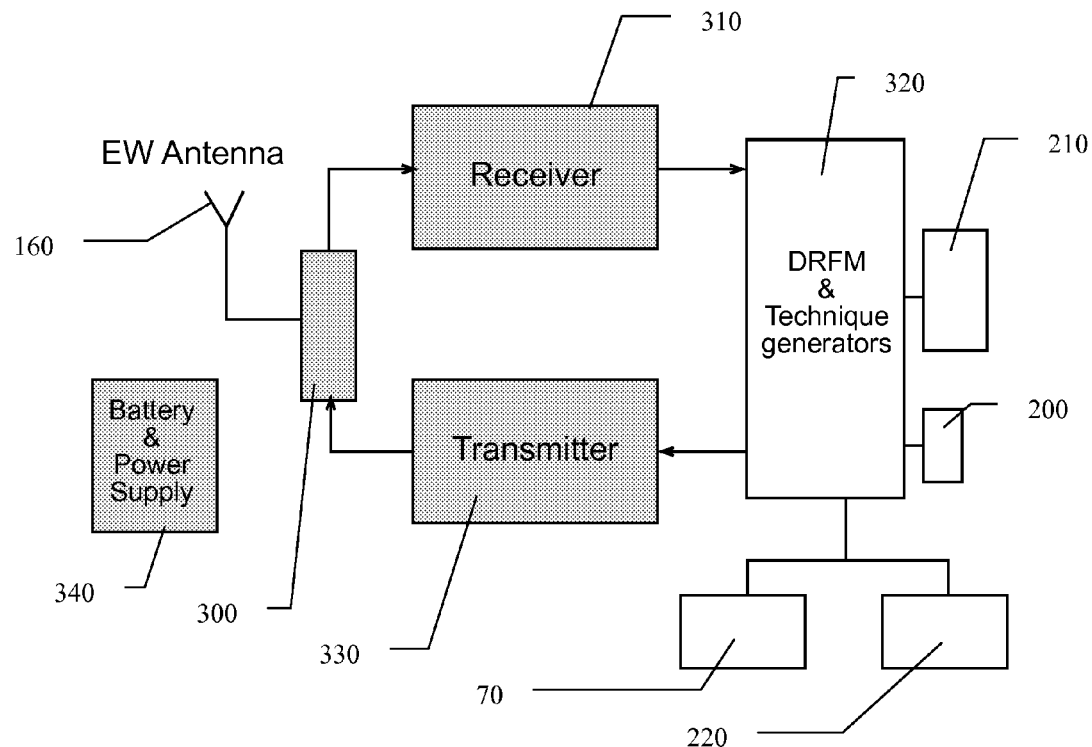
FIG. 5 is an electrical block diagram of an airborne RF decoy of the invention.

The electrical block diagram sketched in FIG. 5 illustrates the functionality of the airborne RF decoy 20. The EW antenna 160 receives the RF signals coming from the radar-based threat. The T/R (transmit/receive) switch or the circulator 300 transfer the received signals to a low noise amplifier (receiver) 310 and then the signal is converted into Base band and processed in the Digital RF Memory (DRFM) 320. The specific EW technique generates a false target, and transfers it to the High Power Transmitter 330. This false target is then transmitted to the air through the same EW antenna 160.

Additional items of wire/proximity module 210, medium range module 220, long-range module 70 and software loading/test connector 200, all connected to the digital board 170, are also shown in FIG. 5. The airborne RF decoy 20 also includes an independent power supply source 340. The power supply source 340 can be a standard alkaline battery or a thermal battery that is activated during the ejection of the airborne RF decoy 20 from the airborne platform 10.

In another aspect of the present invention, a method is provided for protecting an airborne platform 10 against multiple enemy radar-based threats by deceiving an enemy to follow a false target, comprising:

(i) ejecting an airborne RF decoy 20 from the airborne platform 10;

(ii) receiving in the airborne RF decoy 20 a plurality of radar signals from one or more directions;

(iii) storing said plurality of radar signals on the airborne RF decoy 20;

(iv) analyzing said plurality of radar signals by the airborne RF decoy 20 to identify threat parameters;

(v) altering said plurality of radar signals by said airborne RF decoy 20 in order to deceive said multiple radar-based threats; and (vi) transmitting the altered radar signals by said airborne RF decoy 20.

The airborne RF decoy 20 starts its life cycle by "listening" to said plurality of radar signals in order to identify possible radar-based threats, and acquire the specific active radar-based threats. The plurality of radar signals can be stored in DRFM memory 320 or in any memory with similar functionality. Once the existence of the radar-based threat is confirmed, the airborne RF decoy 20 starts to transmit the deceiving signals.

In one embodiment of the present invention, the airborne RF decoy 20 stops transmitting altered signals from time to time and instead analyzes the received radar signals to confirm if each enemy radar-based threat still exists or if the previously identified threat parameters have changed. Threat parameters include frequency, bandwidth, transmission power, pulse repetition frequency (PRF), Doppler shift, low frequency modulation (LMF) of the RF signal, or any combination thereof. The DRFM 320 shown in FIG. 5 updates the false targets accordingly.

Figure 6:
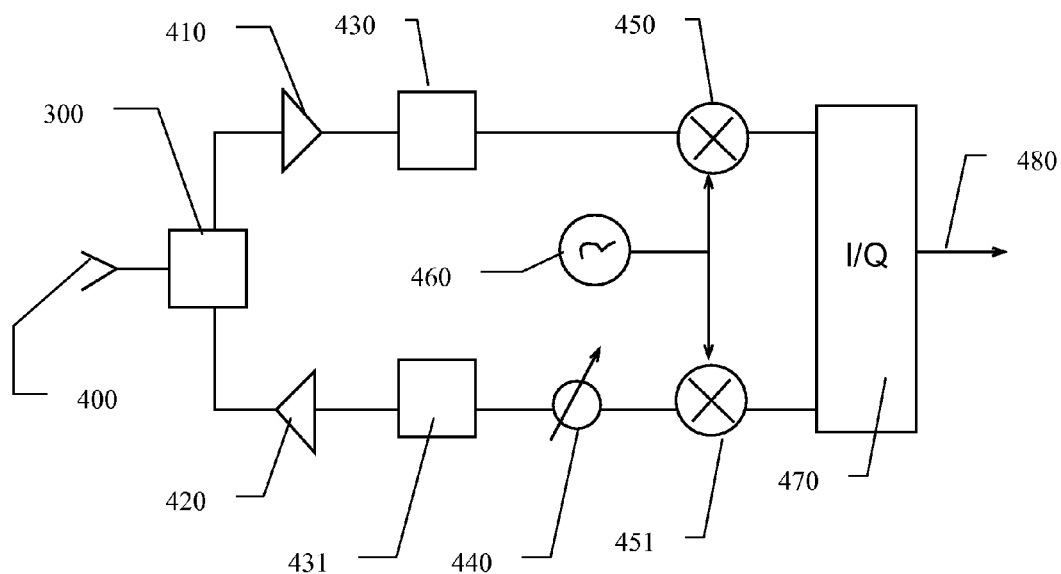
FIG. 6 depicts a layout of the RF board inside an airborne RF decoy of the invention.

The layout of the RF board 140 is further detailed in FIG. 6. The Receive channel includes a switch or a circulator 300, a low noise amplifier 410, a band pass filter 430 and a balanced mixer 450. The transmit channel includes a balanced mixer 451, a phase shifter 440, a band pass filter 431, a high power amplifier 420 and the same switch or circulator 300. The synthesizer unit 460 generates accurate frequency carriers that down convert the signals into low frequency. The RF signals are sampled by I/Q modulator 470 and then transferred unto the DRFM 320.

Figure 7:
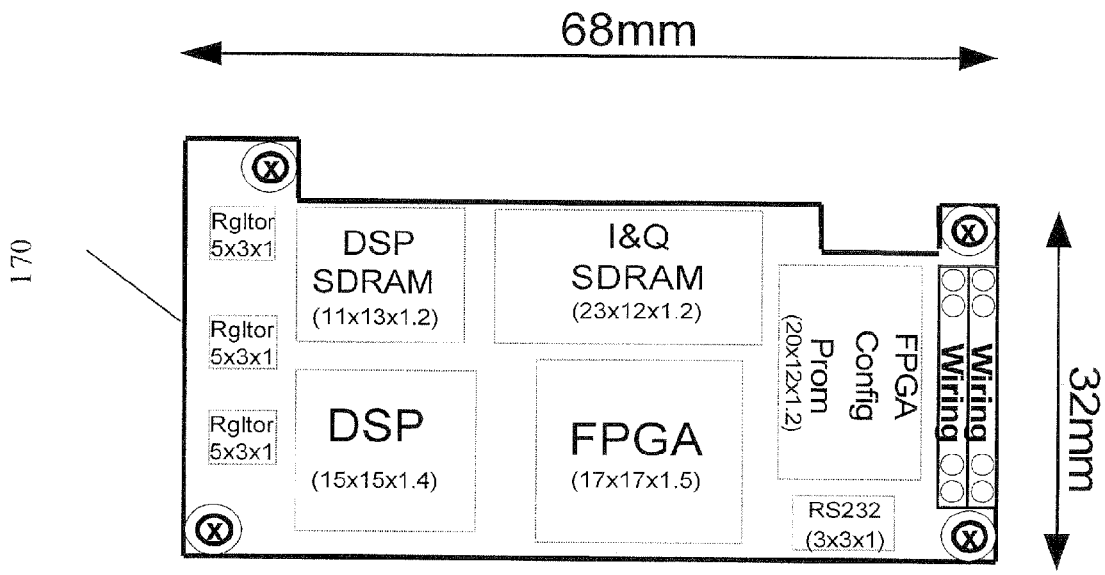
FIG. 7 depicts a top view and a bottom view layout of the digital board inside an airborne RF decoy of the invention.
Figure 7:
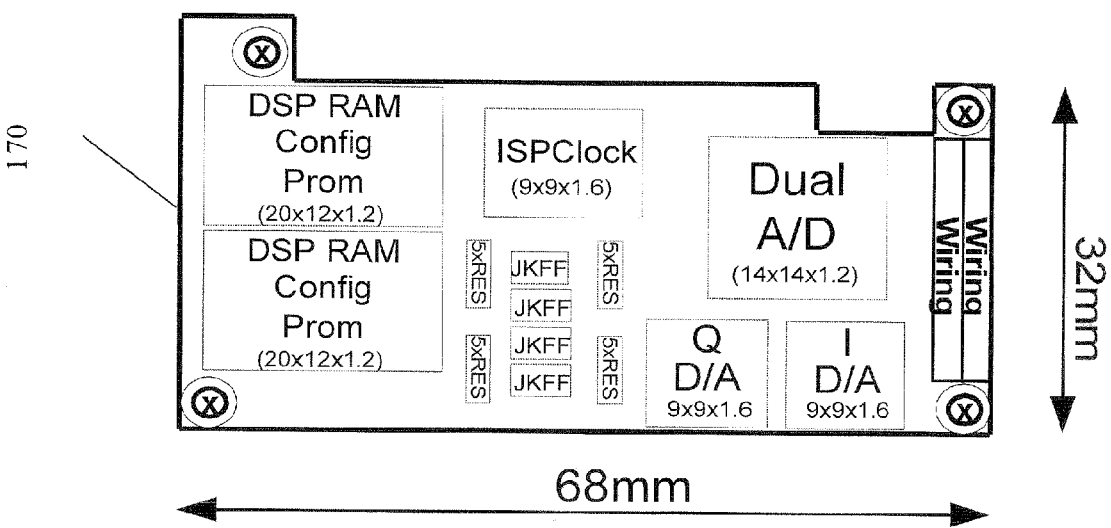

FIG. 7 shows the layout of the Digital Board 170 including digital processors, analog to digital converters, digital to analog converters, memory units and programmable gate arrays. The real time software that controls the mission of the airborne RF decoy 20 resides in this Digital Board 170.

In yet another embodiment of the present invention, the airborne RF decoy 20 enters automatically into an "end of life" mode with self-destruction capability and complete memory erase for sensitive components that carry data.

Figure 8:
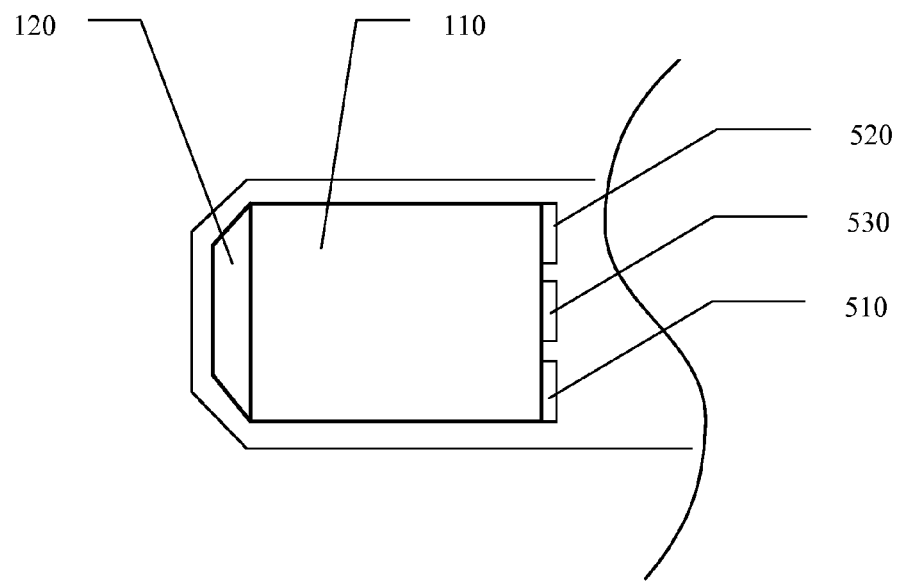
FIG. 8 is a schematic diagram of the battery inside an airborne RF decoy of the invention.

FIG. 8 shows the layout of a thermal battery 110 including the activation mechanism 120 and the connecting positive port 510, negative port 520, and ground port 530.

Figure 9:
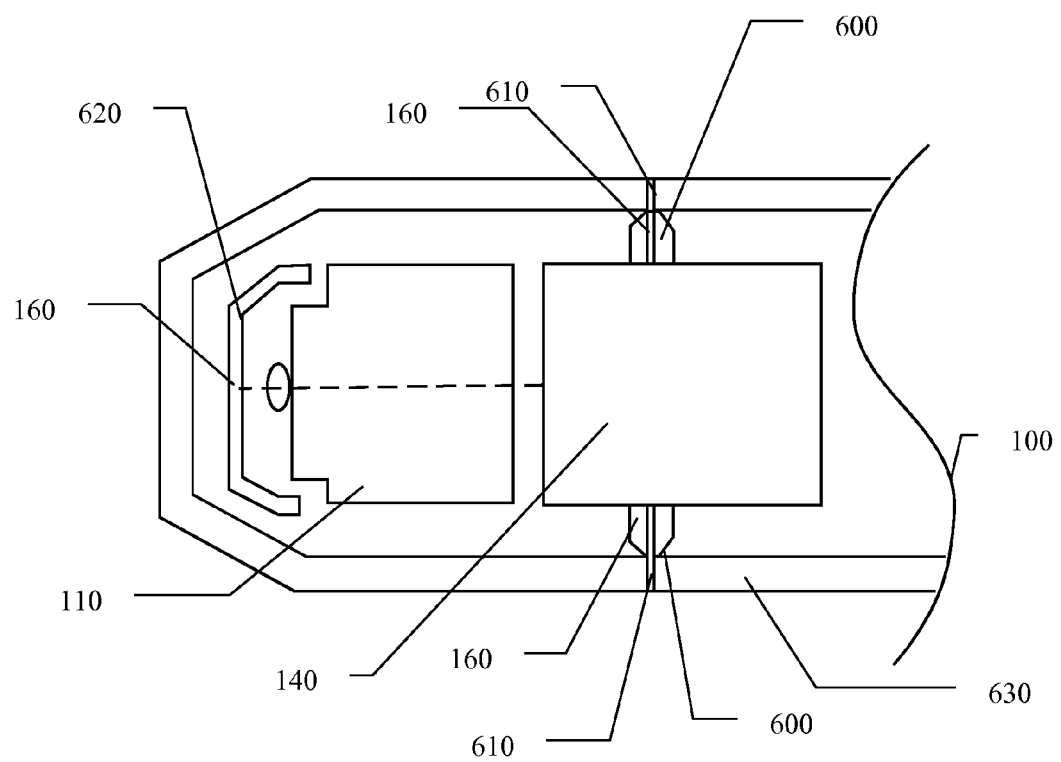
FIG. 9 is a schematic diagram of EW antennas of the airborne RF decoy of the invention.

In yet another embodiment of the present invention, more than one EW antenna 160 is installed in the airborne RF decoy 20. FIG. 9 illustrates a schematic diagram with up to three EW antennas 160. In this case, one EW antenna 160 serves to receive signals while the other one serves to transmit signals. It is even possible to include a third antenna 160 mounted in the front of the airborne RF decoy 20. All the antennas 160 are fed by the RF Board 140 and receive/transmit to the air in a broad spatial coverage (up to 360 degrees in azimuth and at least 90 degrees in elevation). The antenna 160 can be built to operate in a linear polarization while the airborne RF decoy's 20 body 100 is stabilized in the roll plane or in a circular polarization while the airborne RF decoy's 20 body 100 is not stabilized in the roll plane. Thus the antenna 160 enables the airborne RF decoy 20 to operate against multiple enemy radar-based missiles 40 that approach the airborne platform 10 from different directions. The implementation of the antenna can take the form of a small monopole 610, an array of two monopoles, an conformal array of three radiating elements 620 or a helix structure. The monopole antenna 610 is connected to an antenna feed 600. An electric layer 630 connects all the antennas 160. All antenna 160 implementations are mounted on the airborne RF decoy 20 without any erection mechanisms or moving parts. The broad coverage is achieved by a unique combination of scattering by the metallic airborne RF decoy's 20 body 100 itself, such that the body 100 acts as an antenna.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A stand-alone airborne RF decoy adapted for protecting an airborne platform against multiple enemy radar-based threats, said airborne RF decoy comprising:

(i) means for receiving a plurality of radar signals from one or more directions;

(ii) means for storing said plurality of radar signals;

(iii) means for analyzing said plurality of radar signals to identify threat parameters;

(iv) means for altering said plurality of radar signals in order to deceive said multiple enemy radar-based threats;

(v) means for transmitting the altered radar signals;

(vi) an independent power supply source;

(vii) an external form of a standard chaff decoy or a standard flare decoy so that the airborne RF decoy can be ejected from the airborne platform via a standard housing of chaff or flare dispensers; and (viii) vertical and horizontal wings that are opened automatically immediately after ejection from the airborne platform, followed by a pyrotechnic mechanism that brings the wings to their final position so that the airborne RF decoy achieves aerodynamical stability.

2. An airborne RF decoy according to claim 1, wherein said means for transmitting the altered radar signals in said airborne RF decoy stops transmitting altered signals periodically and while said means for transmitting stops transmitting, said means for analyzing analyzes the received radar signals to confirm if each enemy radar-based threat still exists or if the previously identified threat parameters have changed.

3. An airborne RF decoy according to claim 1, wherein said means for receiving a plurality of radar signals are an omni-directional antenna embedded inside the airborne RF decoy, said omnidirectional antenna being implemented without any erection mechanisms or moving parts.

4. An airborne RF decoy according to claim 3, wherein said embedded antenna takes the form of a small monopole, an array of two monopoles or a conformal array of three radiating elements when said antenna operates in a linear polarization.

5. An airborne RF decoy according to claim 3, wherein said embedded antenna takes the form of helical antennas when said antenna operates in a circular polarization.

6. An airborne RF decoy according to claim 1, wherein said threat parameters include: frequency, bandwidth, transmission power, pulse repetition frequency (PRF), Doppler shift, low frequency modulation (LMF) of the RF signal, or any combination thereof.

7. An airborne RF decoy according to claim 1, wherein said airborne RF decoy is configured to be ejected from the airborne platform.

8. An airborne RF decoy according to claim 7, wherein said airborne RF decoy is ejected from the airborne platform via pyrotechnic dispensers.

9. An airborne RF decoy according to claim 7, wherein said airborne RF decoy is ejected from the airborne platform via a dedicated housing.

10. An airborne RF decoy according to claim 1, wherein said enemy radar-base threats include: air-to-air missiles, air-to-air fire-control radars, surface-to-air missiles and surface-to-air and radars.

11. An airborne RF decoy according to claim 1, wherein said airborne platform includes: fighter aircraft, wide-body transport aircraft, wide-body passenger aircraft, unmanned air vehicles, unmanned combat aircraft and balloons.

12. An airborne RF decoy according to claim 1, further including means to control the distance between said airborne RF decoy and said airborne platform.

13. An airborne RF decoy according to claim 12, wherein said means to control the distance include rocket propulsion.

14. An airborne RF decoy according to claim 13, wherein said distance between the airborne RF decoy and the airborne platform ranges from tens to hundreds of meters in both range and altitude.

15. An airborne RF decoy according to claim 1, wherein said airborne RF decoy operates within a broad spatial coverage of up to 360 degrees in azimuth and at least 90 degrees in elevation.

16. An airborne RF decoy according to claim 15, wherein the spatial orientation of the airborne RF decoy, after ejection from the airborne platform, is stabilized in the roll plane.

17. An airborne RF decoy according to claim 15, wherein the spatial orientation of the airborne RF decoy, after ejection from the airborne platform, is not stabilized in the roll plane.

18. An airborne RF decoy according to claim 1, further including means to communicate with the airborne platform.

19. An airborne RF decoy according to claim 18, wherein said means to communicate with the airborne platform include one or more of the following communication links: (i) a wire or proximity link; (ii) short-range wireless link; and (iii) long-range wireless link.

20. An airborne RF decoy according to claim 1, wherein said airborne RF decoy operates in accordance with a pre-flight data instruction file.

21. An airborne RF decoy according to claim 20, wherein said pre-flight data instruction file is loaded by an external data loader via a dedicated connector that is embedded in the decoy, and data loading is done on the ground prior to the flight mission.

22. An airborne RF decoy according to claim 21, wherein said pre-flight data instruction file is updated before ejection by a wire/proximity link, after ejection via a short-range wireless link, via a long-range wireless link, or any combination thereof.

23. An airborne RF decoy according to claim 1, adapted to work together with electronic warfare and electronic countermeasure systems on board of said airborne platform.

24. An airborne RF decoy according to claim 23, wherein said airborne RF decoy and electronic warfare and electronic countermeasure systems on board of said airborne platform cooperate in the use of their jamming resources in order to prevent enemy radar-based threats to track the airborne platform.

25. An airborne RF decoy according to claim 23, including generation of combined synchronization between deceiving signals coming from the airborne platform and deceiving signals coming from the airborne RF decoy.

26. An airborne RF decoy according to claim 1, further including means for minimizing interferences between the airborne RF decoy and the on-board equipment of the airborne platform.

27. An airborne RF decoy according to claim 26, wherein said means for minimizing interferences include either blanking of said airborne RF decoy so it does not interfere with on-board equipment of the airborne platform when operation of said on-board equipment has higher priority; or blanking of on-board systems of the airborne platform that interfere with said airborne RF decoy when operation of said airborne RF decoy has higher priority.

28. An airborne RF decoy according to claim 1, wherein said means for storing said plurality of radar signals are Digital Radio Frequency Memory.

29. An airborne RF decoy according to claim 1, further including means to automatically enter into an "end of life" mode with self-destruction capability and complete memory erasure of sensitive components.

30. An airborne RF decoy according to claim 1, wherein said airborne RF decoy is ejected automatically after an alert from a missile warning system on board of the airborne platform.

31. An airborne RF decoy according to claim 1, wherein said airborne RF decoy is ejected after a manual command of the airborne platform's aircrew.

32. An airborne RF decoy according to claim 1, wherein said power supply is a standard alkaline battery or a thermal battery that is activated during ejection of said airborne RF decoy from the airborne platform.

* * * * *